US009212637B2

(12) United States Patent
Kimura et al.

(10) Patent No.: US 9,212,637 B2
(45) Date of Patent: Dec. 15, 2015

(54) INTAKE PIPE STRUCTURE FOR INTERNAL COMBUSTION ENGINE

(71) Applicants: TOYOTA BOSHOKU KABUSHIKI KAISHA, Aichi-ken (JP); DENSO CORPORATION, Aichi-ken (JP)

(72) Inventors: Ryusuke Kimura, Kariya (JP); Chihori Matsutani, Kariya (JP); Shinichi Kamiya, Kariya (JP)

(73) Assignees: TOYOTA BOSHOKU KABUSHIKI KAISHA, Aichi-Ken (JP); DENSO CORPORATION, Aichi-Ken (JP)

( * ) Notice: Subject to any disclaimer, the term of this patent is extended or adjusted under 35 U.S.C. 154(b) by 46 days.

(21) Appl. No.: 14/074,989

(22) Filed: Nov. 8, 2013

(65) Prior Publication Data

US 2014/0137828 A1 May 22, 2014

(30) Foreign Application Priority Data

Nov. 19, 2012 (JP) ................................ 2012-253546

(51) Int. Cl.
*G01F 1/68* (2006.01)
*F02M 35/10* (2006.01)
*F02M 35/02* (2006.01)

(52) U.S. Cl.
CPC ....... *F02M 35/10386* (2013.01); *F02M 35/021* (2013.01); *F02M 35/10019* (2013.01); *F02M 35/10124* (2013.01); *F02M 35/10144* (2013.01)

(58) Field of Classification Search
CPC .......... F02M 35/10386; F02M 35/021; F02M 35/10019; F02M 35/10124; F02M 35/10144; F02M 35/10016; F02M 35/10091; F02M 35/104
USPC ................................ 73/114.32, 114.33, 861; 123/184.21–184.61
See application file for complete search history.

(56) References Cited

U.S. PATENT DOCUMENTS

| | | | | |
|---|---|---|---|---|
| 4,404,859 | A * | 9/1983 | Ohsawa et al. | 73/861.18 |
| 4,658,640 | A * | 4/1987 | Kido et al. | 73/114.24 |
| 4,798,083 | A * | 1/1989 | Sogawa | 73/114.32 |
| 4,922,879 | A * | 5/1990 | Kaji et al. | 123/494 |
| 4,986,116 | A * | 1/1991 | Usui et al. | 73/114.32 |
| 5,381,691 | A * | 1/1995 | Miyazaki et al. | 73/202.5 |
| 5,741,964 | A * | 4/1998 | Mizutani | 73/114.32 |
| 5,803,608 | A * | 9/1998 | Randoll et al. | 374/144 |
| 5,889,205 | A * | 3/1999 | Treinies et al. | 73/114.32 |
| 6,612,167 | B2 * | 9/2003 | Kamiya | 73/204.22 |
| 2007/0125167 | A1 | 6/2007 | Kitahara | |
| 2009/0164097 | A1 * | 6/2009 | Uda | 701/103 |
| 2012/0240668 | A1 | 9/2012 | Goka et al. | |
| 2013/0025353 | A1 | 1/2013 | Setescak | |
| 2013/0055799 | A1 * | 3/2013 | Tsujii | 73/114.32 |
| 2013/0055801 | A1 * | 3/2013 | Kohno et al. | 73/114.34 |

FOREIGN PATENT DOCUMENTS

| | | |
|---|---|---|
| DE | 10 2010 015 523 | 10/2011 |
| JP | 4-62342 | 5/1992 |
| JP | 09-210749 | 8/1997 |

* cited by examiner

*Primary Examiner* — Marguerite McMahon
(74) *Attorney, Agent, or Firm* — Greenblum & Bernstein, P.L.C.

(57) ABSTRACT

An intake pipe structure for an internal combustion engine is provided. The intake pipe structure includes an air flow meter arranged in an intake pipe and a pair of flow regulating plates. The air flow meter has an entrance and exits. The flow regulating plates are located at positions separated from the air flow meter and extend in a direction of flow of intake air to cover the exits of the air flow meter from opposite sides.

6 Claims, 8 Drawing Sheets

INTAKE PIPE STRUCTURE FOR INTERNAL COMBUSTION ENGINE

BACKGROUND OF THE INVENTION

The present invention relates to an intake pipe structure for an internal combustion engine that includes an air flow meter.

A conventional intake pipe for an internal combustion engine is disclosed, for example, in Japanese Laid-Open Utility Model Publication No. 4-62342. The disclosed intake pipe for an internal combustion engine includes a lattice-like flow regulating member, which is arranged upstream of an air flow meter. In this intake pipe, air flows into the entrance of the air flow meter after being regulated by the flow regulating member. Thus, variations in the amount of intake air detected by the air flow meter are reduced.

SUMMARY OF THE INVENTION

Recently, emission regulations on internal combustion engines mounted on vehicles, particularly, diesel engines, have been tightened. This leads to demands for further reduction in variations in the amount of intake air detected by air flow meters. However, the above described intake pipe structure has limitations on the extent of reduction in the variations of intake air amount.

Accordingly, it is an objective of the present invention to provide an intake pipe structure for an internal combustion engine that reduces variations in intake air amount detected by an air flow meter.

To achieve the foregoing objective, and in accordance with one aspect of the present invention, an intake pipe structure for an internal combustion engine is proposed. The intake pipe structure includes an air flow meter and a pair of flow regulating plates. The air flow meter is arranged in an intake pipe and has an entrance and an exit. The pair of flow regulating plates is arranged in the intake pipe. The flow regulating plates are located at positions separated from the air flow meter and extend in a direction of flow of intake air to cover the exit of the air flow meter from opposite sides.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An intake pipe structure for an internal combustion engine according to one embodiment will now be described with reference to FIGS. 1 to 6.

Figure 1:
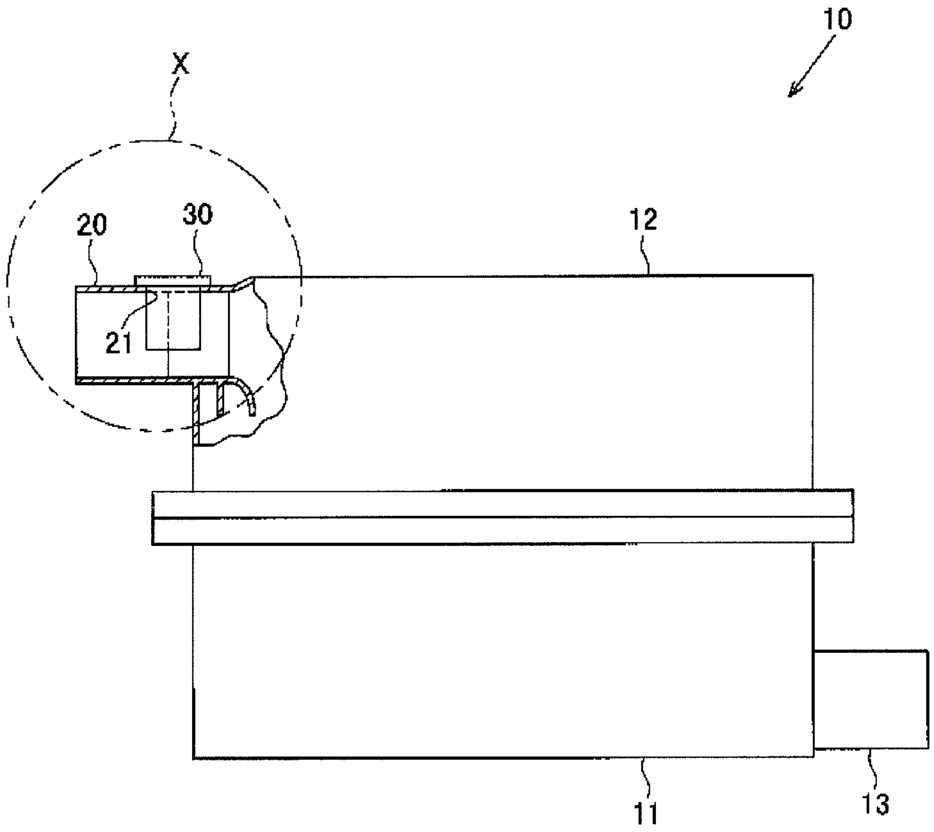
FIG. 1 is a front view showing an air cleaner according to one embodiment.

As shown in FIG. 1, an air cleaner 10 includes a case 11 and a cap 12, which covers the opening of the case 11. A cylindrical inlet pipe 13 is attached to a side surface of the case 11. The inlet pipe 13 communicates with the interior of the case 11. A cylindrical outlet pipe 20 is attached to a side surface of the cap 12. The outlet pipe 20 communicates with the interior of the cap 12. The air cleaner 10 incorporates a filter element (not shown), which is arranged over the entire cross-section of the flow passage. The case 11 and the inlet pipe 13 are integrally molded of a thermoplastic by injection molding. Also, the cap 12 and the outlet pipe 20 are integrally molded of a thermoplastic by injection molding.

The outlet pipe 20 has an insertion hole 21, into which a thermal type air flow meter 30 is inserted. The air flow meter 30 detects the intake air amount.

Figure 2:
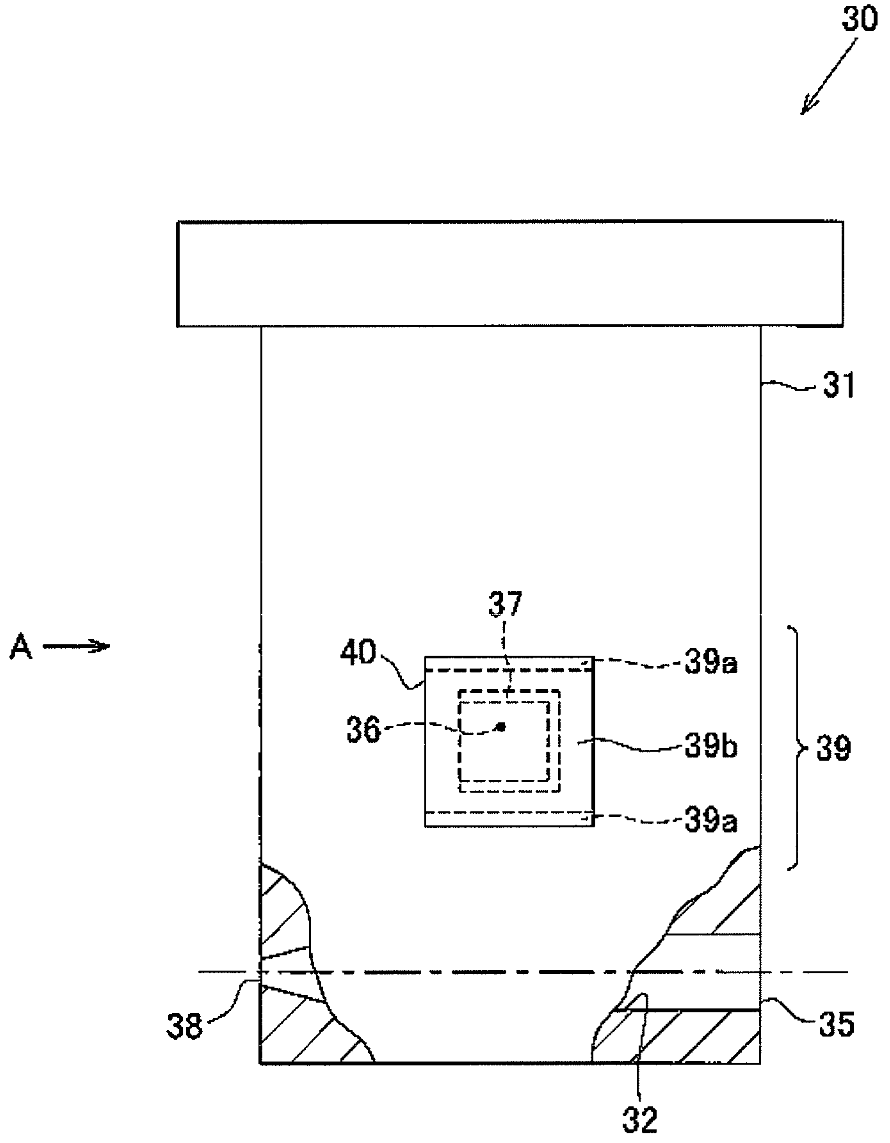
FIG. 2 is a side view showing the air flow meter according to the embodiment shown in FIG. 1.
Figure 3:
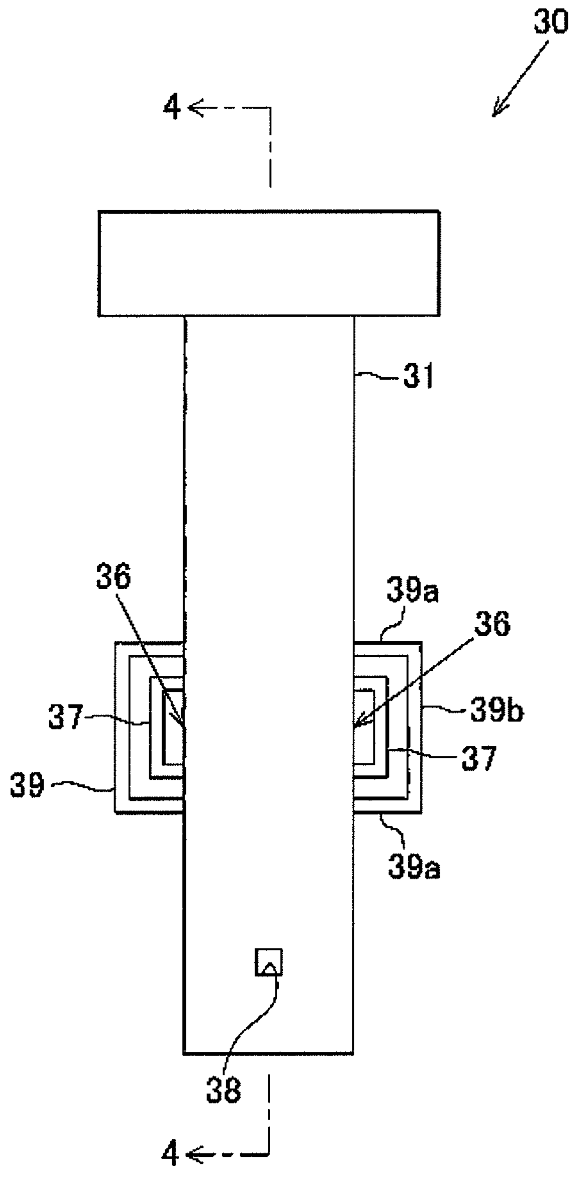
FIG. 3 is a rear view of the air flow meter as viewed in the direction of arrow A in FIG. 2.
Figure 4:
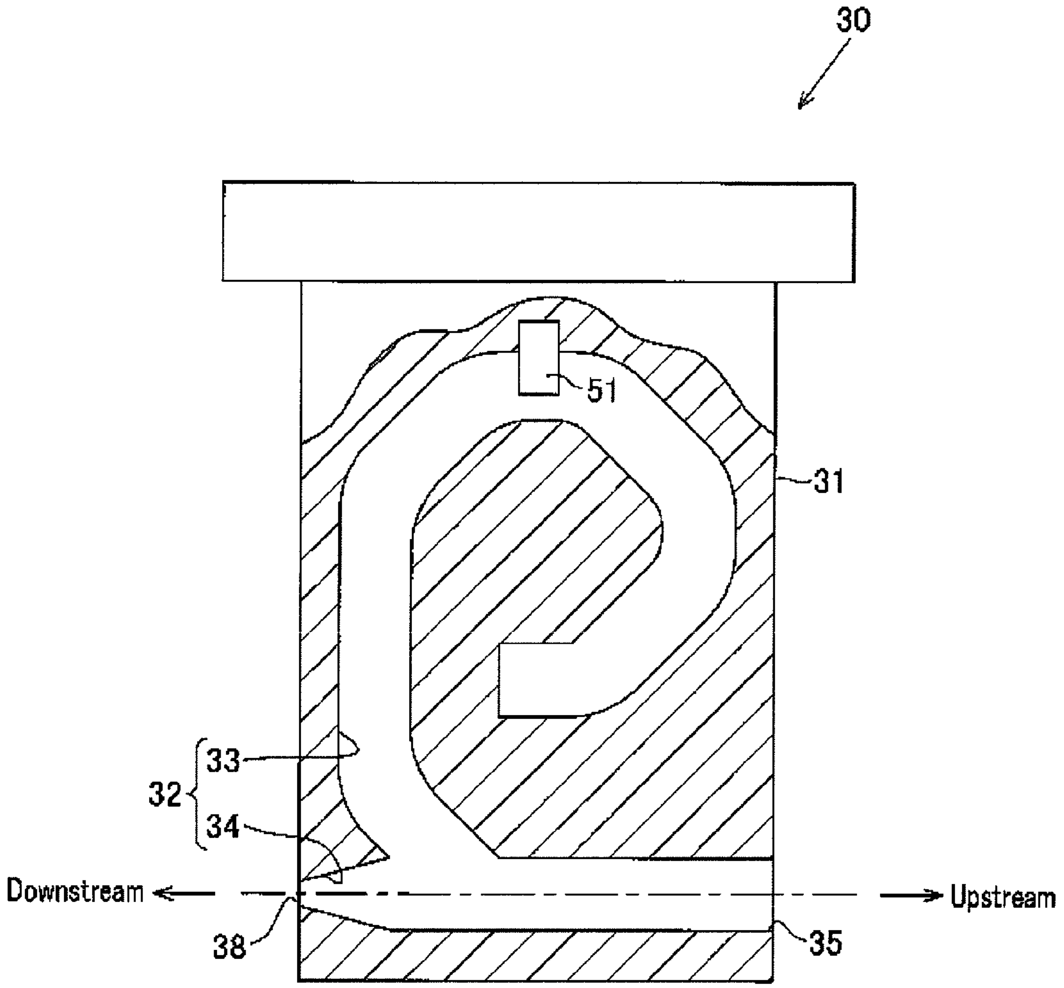
FIG. 4 is a cross-sectional view of the air flow meter taken along line 4-4 of FIG. 3.

As illustrated in FIGS. 2 to 4, the air flow meter 30 has a meter main body 31, which is located inside the outlet pipe 20. The meter main body 31 includes a distal end, which is located in the outlet pipe 20, and a proximal end, which is located in the vicinity of the surface of the outlet pipe 20.

As shown in FIGS. 2 and 4, the meter main body 31 has an inside flow passage 32 for allowing some of the air through the outlet pipe 20 to flow.

As shown in FIG. 4, the inside flow passage 32 has an entrance 35, which opens on an upstream side in the flow of intake air in the meter main body 31. The entrance 35 is located in the vicinity of the distal end of the meter main body 31. The inside flow passage 32 extends from the entrance 35 toward the downstream end of the intake air flow, and bifurcates, in the middle, into a main passage 33 and a sub-passage 34.

The sub-passage 34 is designed for separating dust mixed in air by means of centrifugal separation. The sub-passage 34 extends toward the downstream end from the bifurcation with the main passage 33. The sub-passage 34 has a discharge portion 38, which opens on a downstream side in the flow of intake air in the meter main body 31. The discharge portion 38 is located in the vicinity of the distal end of the meter main body 31. The inner diameter of the sub-passage 34 gradually decreases from the bifurcation toward the discharge portion 38.

The main passage 33 extends toward the proximal end of the meter main body 31 from the bifurcation with the sub-passage 34. A detecting portion 51 for detecting the amount of air passing through the main passage 33 is provided in the main passage 33.

As shown in FIG. 2, the meter main body 31 has a pair of main body openings 36 each provided on a side surface. The main passage 33 extends to the main body openings 36. That is, the main body openings 36 form a downstream end of the main passage 33.

As shown in FIGS. 2 and 3, the meter main body 31 has a pair of discharge ducts 37 such that one discharge duct is provided on each of opposite side surfaces. The discharge ducts 37 cover the main body openings 36. The corresponding discharge duct 37 is connected to the meter main body 31 at a part of the periphery of each main body opening 36 excluding the downstream edge. Each discharge duct 37 forms a downstream facing opening, which is located between the discharge duct 37 and the downstream edge of the periphery of the corresponding main body opening 36.

A pair of flow regulating portions 39 is formed such that one flow regulating portion 39 is located on each of opposite sides of the meter main body 31. The flow regulating portions 39 are larger than the discharge ducts 37 and cover the entire discharge ducts 37, respectively. Each flow regulating portion 39 has a pair of legs 39*a* and a flat plate-like wall 39*b* extending between the distal ends of the legs 39*a*. The legs 39*a* extend from parts of the meter main body 31 that are respectively closer to the proximal end and closer to the distal end than the corresponding discharge duct 37. The legs 39*a* and the wall 39*b* are separated from the discharge duct 37 by a clearance, which forms an air flow passage. Thus, the downstream end of each flow regulating portion 39 and the corresponding side surface of the meter main body 31 form an exit 40 of the air flow meter 30.

Figure 5:
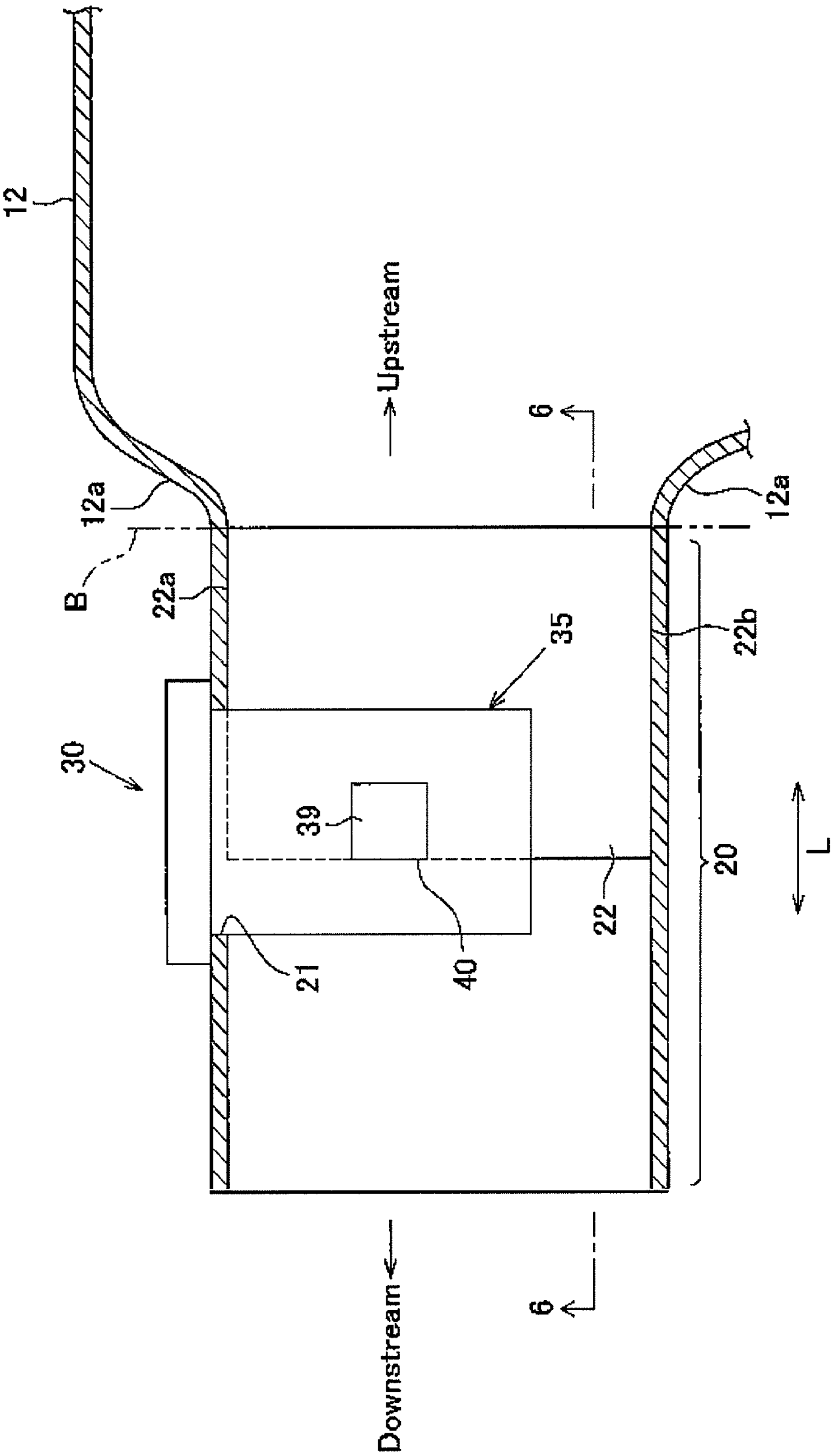
FIG. 5 is an enlarged cross-sectional view of section X in FIG. 1, mainly showing the outlet pipe.
Figure 6:
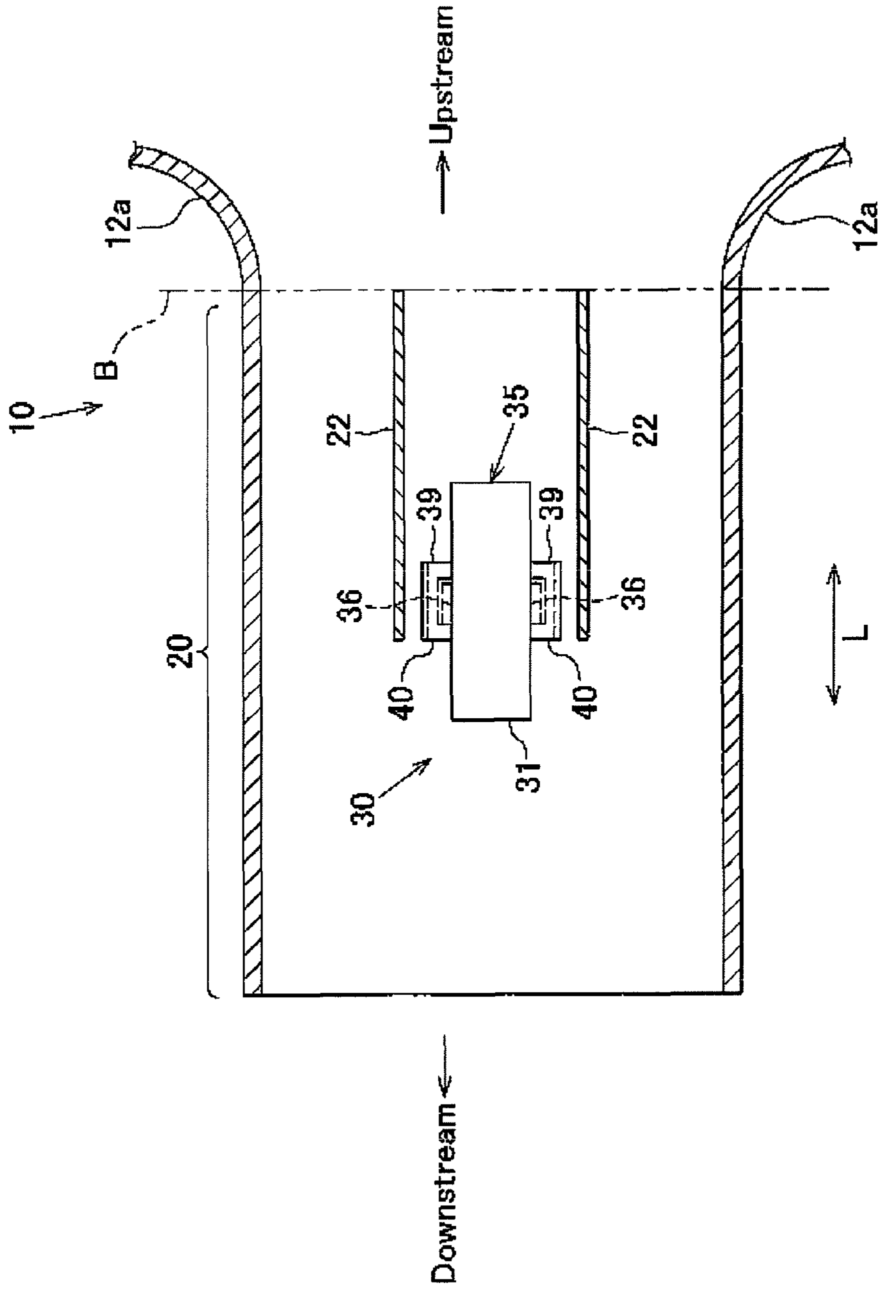
FIG. 6 is a cross-sectional view taken along line 6-6 of FIG. 5, mainly showing the outlet pipe.

As shown in FIGS. 5 and 6, flow regulating plates 22, which extend in the flowing direction of intake air, that is, the axial direction L of the outlet pipe 20, are located on opposite sides of the meter main body 31 in the outlet pipe 20, respectively. The flow regulating plates 22 are molded integrally with the outlet pipe 20. Specifically, opposite ends 22*a*, 22*b* of each flow regulating plate 22 in a direction perpendicular to the intake air flowing direction are integrally coupled with the inner walls of the outlet pipe 20. The upstream ends of the flow regulating plates 22 are located on a boundary line B between the outlet pipe 20 and a curved portion 12*a* of the cap 12. The flow regulating plates 22 extend from the upstream end of the outlet pipe 20 to the exits 40 of the air flow meter 30. Each flow regulating plate 22 is separated from the wall 39*b* of the corresponding flow regulating portion 39 by a clearance, which forms an air flow passage. Therefore, the entrance 35 and the exits 40 of the air flow meter 30 are covered by the flow regulating plates 22 from the sides.

Operation of the present embodiment will now be described.

Since the flow regulating portions 39 are formed on opposite sides of the meter main body 31 of the air flow meter 30 to cover the discharge ducts 37, the flow of air in the vicinity of the opening of the discharge ducts 37 is regulated.

The flow regulating plates 22, each of which has a larger surface area than the corresponding flow regulating portion 39, are arranged on the sides of the flow regulating portions 39. The flow regulating plates 22 thus have a higher flow regulating performance than the flow regulating portions 39. The flow regulating plates 22 are located at positions separated from the air flow meter 30 to cover the air flow meter 30 from the entrance 35 to the exits 40. Thus, in the outlet pipe 20, the flow of air from the vicinity of the entrance 35 of the air flow meter 30 to the vicinity of the exits 40 is regulated by the flow regulating plates 22.

Accordingly, the flow of air in the inside flow passage 32 of the air flow meter 30 is stabilized, so that the air flow about the detecting portion 51 is stabilized.

Also, the pair of flow regulating plates 22 extends in the direction of the flow of intake air. Therefore, as compared to cases in which, for example, a lattice-like or mesh-like flow regulating member is used, the pressure loss of intake air is reduced.

The intake pipe structure for an internal combustion engine according to the present embodiment has the following advantages.

(1) The meter main body 31 of the air flow meter 30 has the discharge ducts 37 provided on opposite side surfaces. The discharge ducts 37 cover the main body openings 36. In the periphery of each main body opening 36, the corresponding discharge duct 37 is connected to the meter main body 31 at locations excluding the downstream edge. Therefore, the air from each main body opening 36 flows in the direction of the flow of intake air in the outlet pipe 20 toward the downstream end without being disturbed. Further, the discharge ducts 37 are each entirely covered by a corresponding one of the pair of flow regulating portions 39 from the side. Therefore, air about the air flow from the main body openings 36 is regulated. The pair of flow regulating plates 22 is arranged in the outlet pipe 20. The flow regulating plates 22 are located at positions separated from the air flow meter 30 and extend in the direction of the flow of intake air. The flow regulating plates 22 cover the exits 40 of the air flow meter 30 from the sides. This configuration regulates the flow of air about the air flow meter 30 in the outlet pipe 20, particularly, the flow of air from the exits 40. Accordingly, the flow of air in the air flow meter 30 is stabilized, so that the air flow about the detecting portion 51, which is located in the air flow meter 30, is stabilized. Further, the pair of flow regulating plates 22 extends in the direction of the flow of intake air. Thus, compared to a case in which a lattice-like flow regulating member is arranged over the entire cross-section of the flow passage of the outlet pipe 20, the pressure loss due to addition of the flow regulating plates 22 is small. This suppresses the pressure loss of intake air and reduces the variations in the amount of intake air detected by the air flow meter 30.

(2) The ends 22*a*, 22*b* of each flow regulating plate 22 in the direction perpendicular to the flow direction of intake air are integrally formed with the inner walls of the outlet pipe 20. Thus, the rigidity of the flow regulating plates 22 and the outlet pipe 20 is higher than those in a case where flow regulating pipes are supported by inner walls of an outlet pipe in a cantilever-like manner.

(3) The flow regulating plates 22 cover the air flow meter 30 from the entrance 35 to the exits 40. Thus, in the outlet pipe 20, the flow of air from the vicinity of the entrance 35 of the air flow meter 30 to the vicinity of the exits 40 is regulated by the flow regulating plates 22. Accordingly, the flow of air in the air flow meter 30 is stabilized, so that the air flow about the detecting portion 51, which is located in the air flow meter 30, is stabilized. This reduces variations in the amount of intake air.

(4) The flow regulating plates 22 are molded integrally with the outlet pipe 20. This simplifies the manufacture of the air cleaner 10 compared to a case in which a separately formed flow regulating plates are assembled with an outlet pipe. Also, this configuration prevents the number of components from being increased and thus simplifies the structure.

(5) In the present embodiment, the flow regulating plates 22 are arranged only inside the outlet pipe 20 and are not extended to the curved portion 12*a* of the cap 12. In the structure in which the outlet pipe 20 is integrally connected to the curved portion 12*a* of the cap 12, the outlet pipe 20 and the cap 12 can be integrally formed by injection molding. At this time, to avoid forming of undercuts, different molds are used for a section upstream and a section downstream of the boundary line B between the outlet pipe 20 and the cap 12, and the demolding directions of the molds are different from each other. Therefore, in a case in which flow regulating plates extend to a curved portion of a cap, a flash is formed at a part of the surface of each flow regulating plate that corresponds to the boundary line B, that is, at the boundary between the upstream mold and the downstream mold. The flash disturbs the flow of air in the outlet pipe 20.

In this regard, the present embodiment suppresses formation of flashes on the surface of the flow regulating plates 22 in a suitable manner, so that the flow regulating plates 22 are capable of regulating air flows in a favorable manner.

The intake pipe structure for an internal combustion engine according to the present invention is not to be restricted to configurations shown in the above embodiment, but may be modified as shown below.

Figure 7:
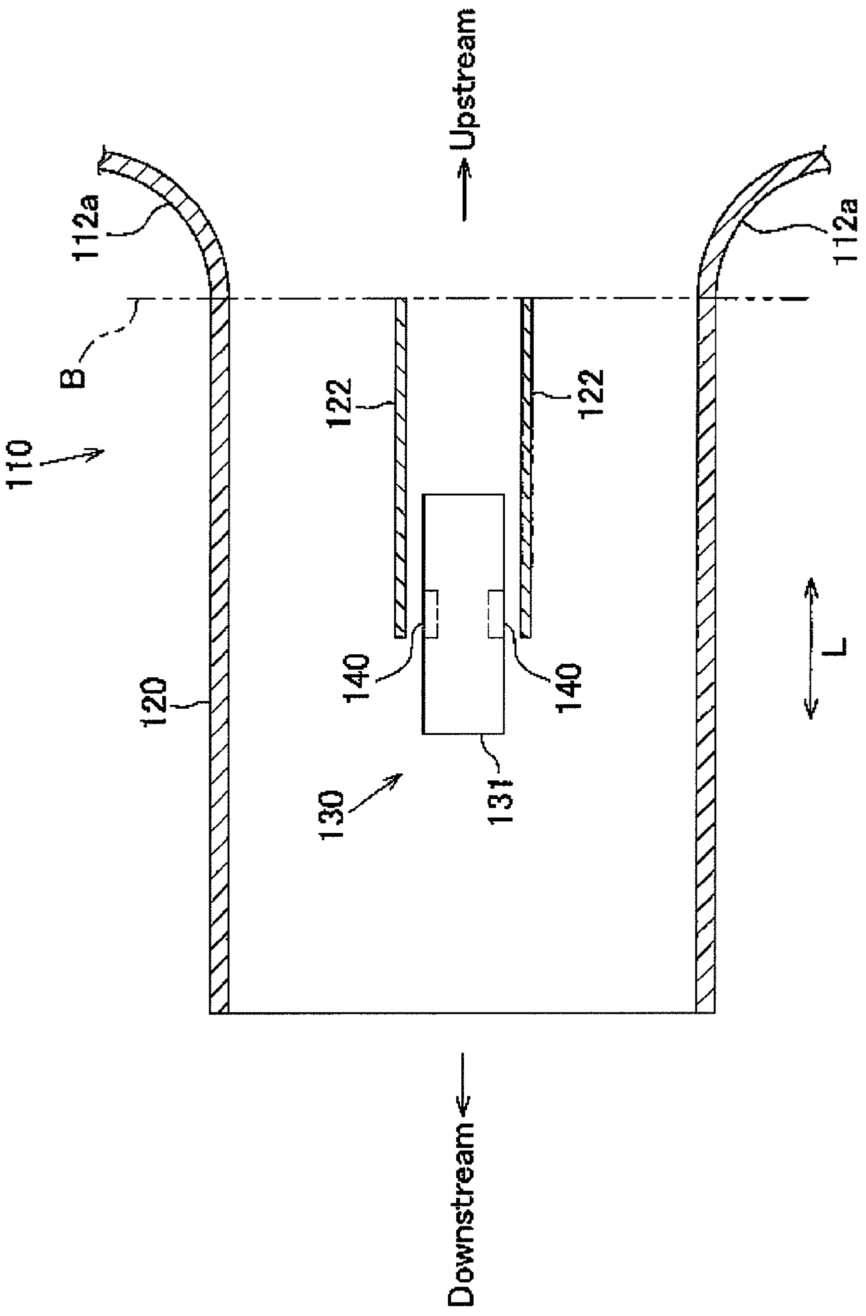
FIG. 7 is a cross-sectional view mainly showing an outlet pipe of a modification.

An air flow meter 130 shown in FIG. 7 may be employed. The air flow meter 130 has a pair of exits 140, which are located on sides of a meter main body 131 and open to the sides. In this case, for example, a pair of flow regulating plates 122 may be provided, which extends from an upstream end of an outlet pipe 120 in the axial direction L of the outlet pipe 120 to the downstream ends of the exits 140 to cover the exits 140 from the sides.

Figure 8:
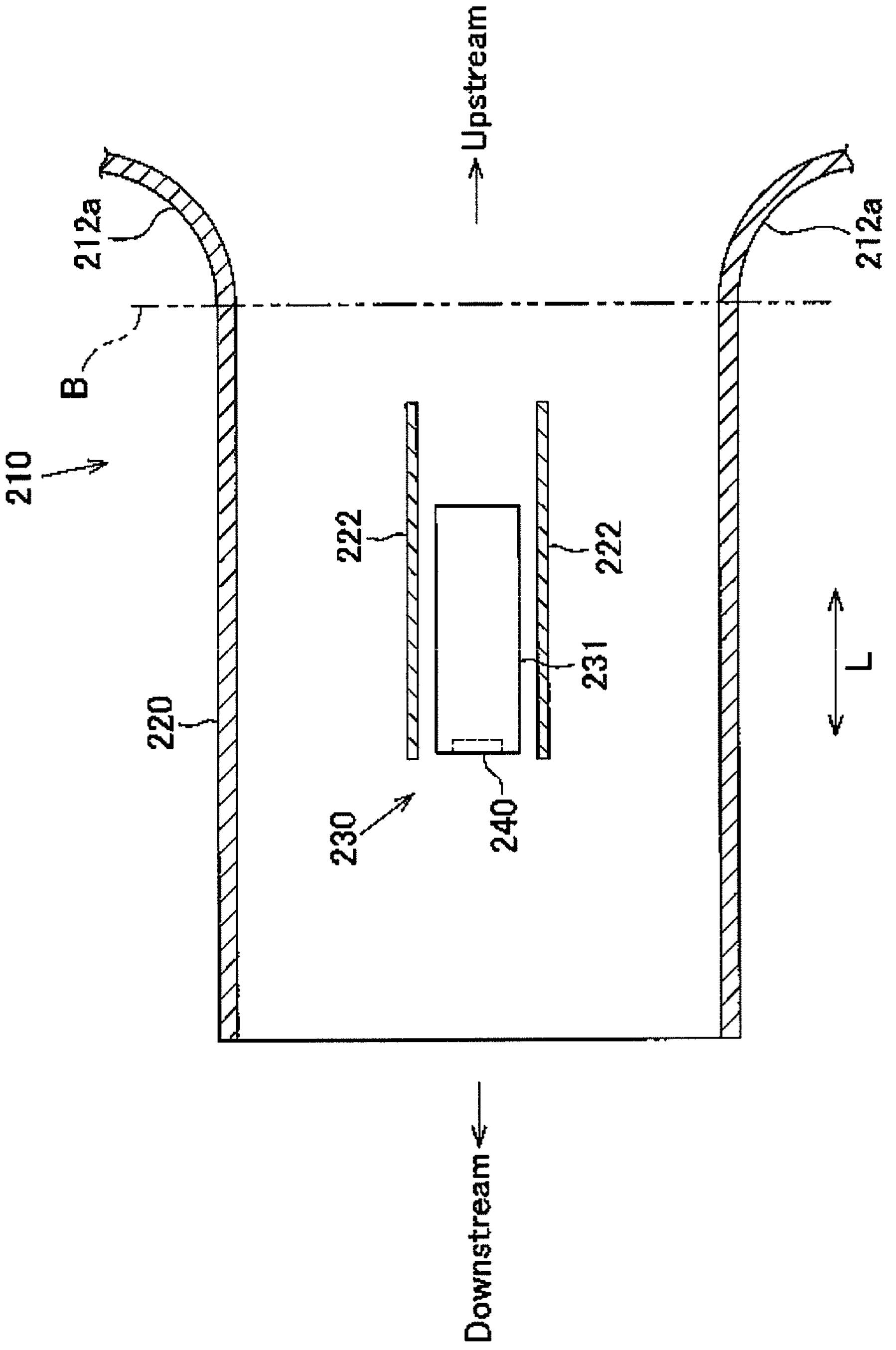
FIG. 8 is a cross-sectional view mainly showing an outlet pipe of another modification.

An air flow meter 230 shown in FIG. 8 may be employed. The air flow meter 230 has an exit 240 formed in a downstream side of a meter main body 231 in the direction of flow of intake air. In this case, for example, a pair of flow regulating plates 222 may be provided, which extend from a position upstream of the meter main body 131 in the axial direction L of the outlet pipe 220 to a position downstream of the exit 240 to cover the exit 240 from the sides.

Separately formed flow regulating plates may be fixed to the inner walls of an outlet pipe, for example, by welding. In this case, the flow regulating plates may extend to the curved portion of a cap connected to the outlet pipe.

A separately formed outlet pipe may be fixed to the cap of an air cleaner, for example, by welding.

In addition to flow regulating plates for covering the exits of the air flow meter, a flow regulating member may be provided at a position upstream of the air flow meter in the direction of flow of intake air.

A cantilever-like structure may be employed in which only one end of each flow regulating plate is supported by the inner wall of the outlet port.

Therefore, the present examples and embodiments are to be considered as illustrative and not restrictive and the invention is not to be limited to the details given herein, but may be modified within the scope and equivalence of the appended claims.

The invention claimed is:

1. An intake pipe structure for an internal combustion engine, comprising:

an air flow meter, which is arranged in an intake pipe and has an entrance and an exit; and a pair of flow regulating plates arranged in the intake pipe, wherein the flow regulating plates are located at positions separated from the air flow meter and extend in a direction of flow of intake air to cover the exit of the air flow meter from opposite sides, wherein the air flow meter includes:

a meter main body having an inside flow passage with a pair of openings, wherein the openings are formed on opposite side surfaces of the meter main body, and a discharge duct covering each respective opening, each discharge duct structured and arranged to form a single outlet as a downstream facing opening.

2. The intake pipe structure for an internal combustion engine according to claim 1, wherein the flow regulating plates cover a downstream end of the exit in the direction of flow of intake air.

3. The intake pipe structure for an internal combustion engine according to claim 1, wherein opposite ends of each flow regulating plate in a direction perpendicular to the direction of flow of intake air are joined to inner walls of the intake pipe.

4. The intake pipe structure for an internal combustion engine according to claim 1, wherein the flow regulating plates cover the air flow meter from the entrance to the exit.

5. The intake pipe structure for an internal combustion engine according to claim 1, wherein the flow regulating plates are molded integrally with the intake pipe.

6. The intake pipe structure for an internal combustion engine according to claim 1, wherein the air flow meter additionally includes a pair of flow regulating portions, wherein the flow regulating portions are located at positions separated from the openings and extend in the direction of flow of intake air to cover the openings from opposite sides, wherein the exit is formed by a downstream end of one of the flow regulating portions in the direction of flow of intake air and a side surface of the meter main body, and the flow regulating plates cover the downstream ends of the flow regulating portions in the direction of flow intake air.

* * * * *